US009043209B2

(12) United States Patent
Yamamoto et al.

(10) Patent No.: US 9,043,209 B2
(45) Date of Patent: May 26, 2015

(54) LANGUAGE MODEL CREATION DEVICE

(75) Inventors: Hitoshi Yamamoto, Tokyo (JP); Ken Hanazawa, Tokyo (JP); Kiyokazu Miki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1044 days.

(21) Appl. No.: 13/129,721

(22) PCT Filed: Sep. 3, 2009

(86) PCT No.: PCT/JP2009/004341
§ 371 (c)(1),
(2), (4) Date: May 17, 2011

(87) PCT Pub. No.: WO2010/061507
PCT Pub. Date: Jun. 3, 2010

(65) Prior Publication Data
US 2011/0231183 A1 Sep. 22, 2011

(30) Foreign Application Priority Data

Nov. 28, 2008 (JP) .................................. 2008-304564

(51) Int. Cl.
*G10L 15/14* (2006.01)
*G10L 15/00* (2013.01)
(Continued)

(52) U.S. Cl.
CPC .......... *G10L 15/197* (2013.01); *G10L 15/1815* (2013.01); *G10L 15/183* (2013.01); *G10L 15/19* (2013.01)

(58) Field of Classification Search
CPC ... G10L 15/1815; G10L 15/183; G10L 15/19; G10L 15/193; G10L 15/197
USPC .............................................. 704/256.2, 257
See application file for complete search history.

(56) References Cited

U.S. PATENT DOCUMENTS 5,457,768 A * 10/1995 Tsuboi et al. ................. 704/231
5,541,836 A * 7/1996 Church et al. ..................... 704/7
(Continued)

FOREIGN PATENT DOCUMENTS

JP 11-259084 A 9/1999
JP 2002-229589 A 8/2002
(Continued)

OTHER PUBLICATIONS

John Lafferty, et al., "Conditional Random Fields: Probabilistic Models for Segmenting and Labeling Sequence Data", Proceedings of 18th International Conference on Machine Learning (ICML 2001), 2001, pp. 282-289.

*Primary Examiner* — Eric Yen
(74) *Attorney, Agent, or Firm* — Sughrue Mion, PLLC

(57) ABSTRACT

This device 301 stores a first content-specific language model representing a probability that a specific word appears in a word sequence representing a first content, and a second content-specific language model representing a probability that the specific word appears in a word sequence representing a second content. Based on a first probability parameter representing a probability that a content represented by a target word sequence included in a speech recognition hypothesis generated by a speech recognition process of recognizing a word sequence corresponding to a speech, a second probability parameter representing a probability that the content represented by the target word sequence is a second content, the first content-specific language model and the second content-specific language model, the device creates a language model representing a probability that the specific word appears in a word sequence corresponding to a part corresponding to the target word sequence of the speech.

22 Claims, 9 Drawing Sheets

(51) Int. Cl.
*G10L 15/18* (2013.01)
*G10L 15/197* (2013.01)
*G10L 15/183* (2013.01)
*G10L 15/19* (2013.01)

(56) References Cited

U.S. PATENT DOCUMENTS

| | | | |
|---|---|---|---|
| 5,828,999 A * | 10/1998 | Bellegarda et al. | 704/240 |
| 5,842,163 A * | 11/1998 | Weintraub | 704/240 |
| 5,873,056 A * | 2/1999 | Liddy et al. | 704/9 |
| 6,006,221 A * | 12/1999 | Liddy et al. | 1/1 |
| 6,839,670 B1 * | 1/2005 | Stammler et al. | 704/251 |
| 7,072,827 B1 * | 7/2006 | Carmel et al. | 704/9 |
| 7,133,827 B1 * | 11/2006 | Gillick et al. | 704/243 |
| 7,487,094 B1 * | 2/2009 | Konig et al. | 704/270 |
| 2001/0014859 A1 * | 8/2001 | Itoh et al. | 704/240 |
| 2002/0032565 A1 * | 3/2002 | Rose | 704/240 |
| 2002/0038207 A1 * | 3/2002 | Mori et al. | 704/9 |
| 2003/0091163 A1 * | 5/2003 | Attwater et al. | 379/88.01 |
| 2004/0088162 A1 * | 5/2004 | He et al. | 704/235 |
| 2004/0111259 A1 * | 6/2004 | Miller et al. | 704/231 |
| 2004/0167778 A1 * | 8/2004 | Valsan et al. | 704/231 |
| 2005/0080613 A1 * | 4/2005 | Colledge et al. | 704/9 |
| 2005/0234722 A1 * | 10/2005 | Robinson et al. | 704/257 |
| 2006/0074631 A1 * | 4/2006 | Wang et al. | 704/9 |
| 2006/0100876 A1 * | 5/2006 | Nishizaki et al. | 704/257 |
| 2006/0247917 A1 * | 11/2006 | Fux et al. | 704/9 |
| 2007/0136689 A1 * | 6/2007 | Richardson-Bunbury et al. | 715/816 |
| 2008/0240396 A1 * | 10/2008 | Faizakov et al. | 379/211.02 |
| 2009/0271195 A1 * | 10/2009 | Kitade et al. | 704/239 |

FOREIGN PATENT DOCUMENTS

| | | |
|---|---|---|
| JP | 2004-198597 A | 7/2004 |
| JP | 2005-284209 A | 10/2005 |
| WO | 2005/122143 A1 | 12/2005 |
| WO | 2008/001485 A1 | 1/2008 |
| WO | 2008/004666 A1 | 1/2008 |

* cited by examiner

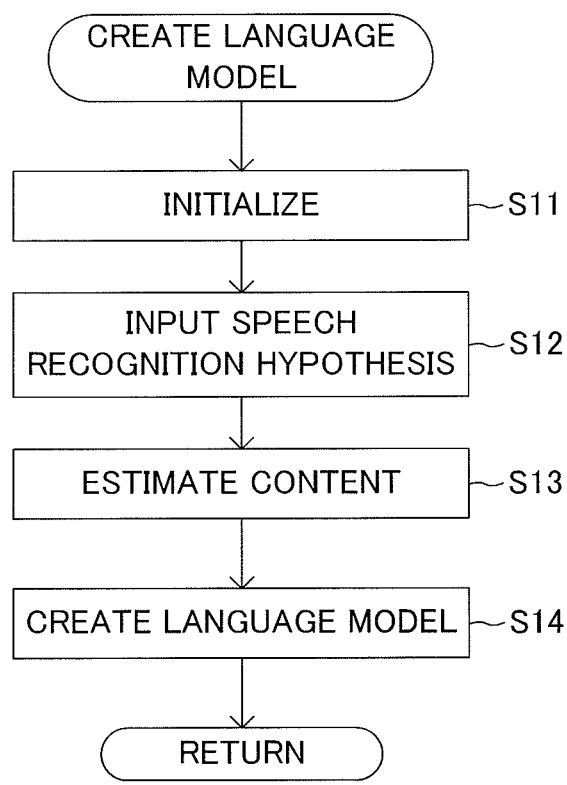

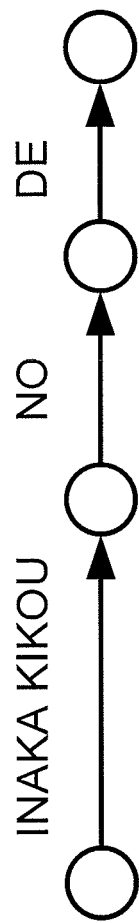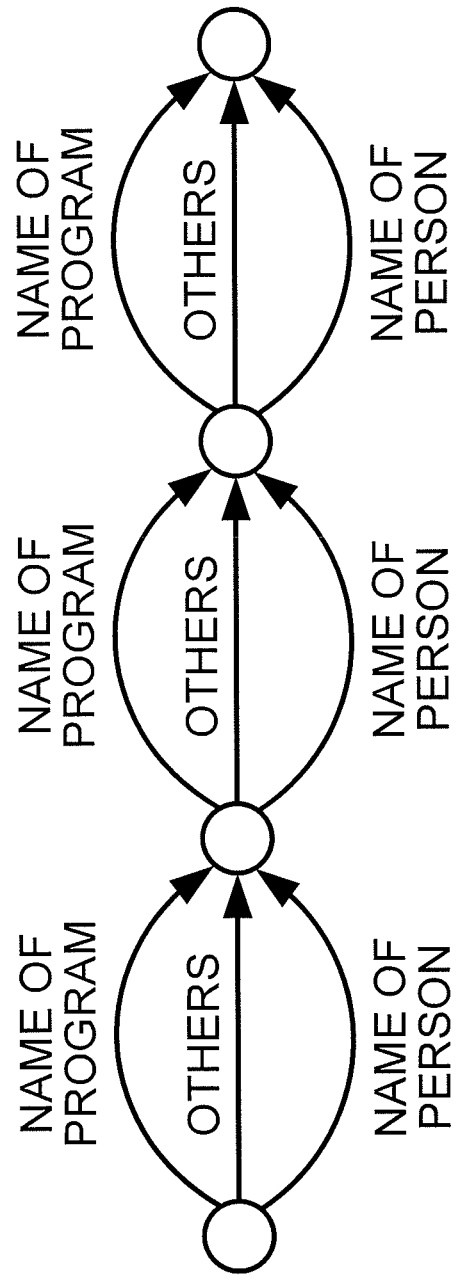

Fig.5

PART OF SPEECH : NOUN
RELIABILITY : 0.4
POSITION : ANTERIOR HALF
COLLOCATION : APPEAR
...

Fig.6 f(PART OF SPEECH = NOUN) : 1
f(RELIABILITY) : 0.4
f(POSITION = ANTERIOR HALF) : 1
f(COLLOCATION = APPEAR) : 1
...

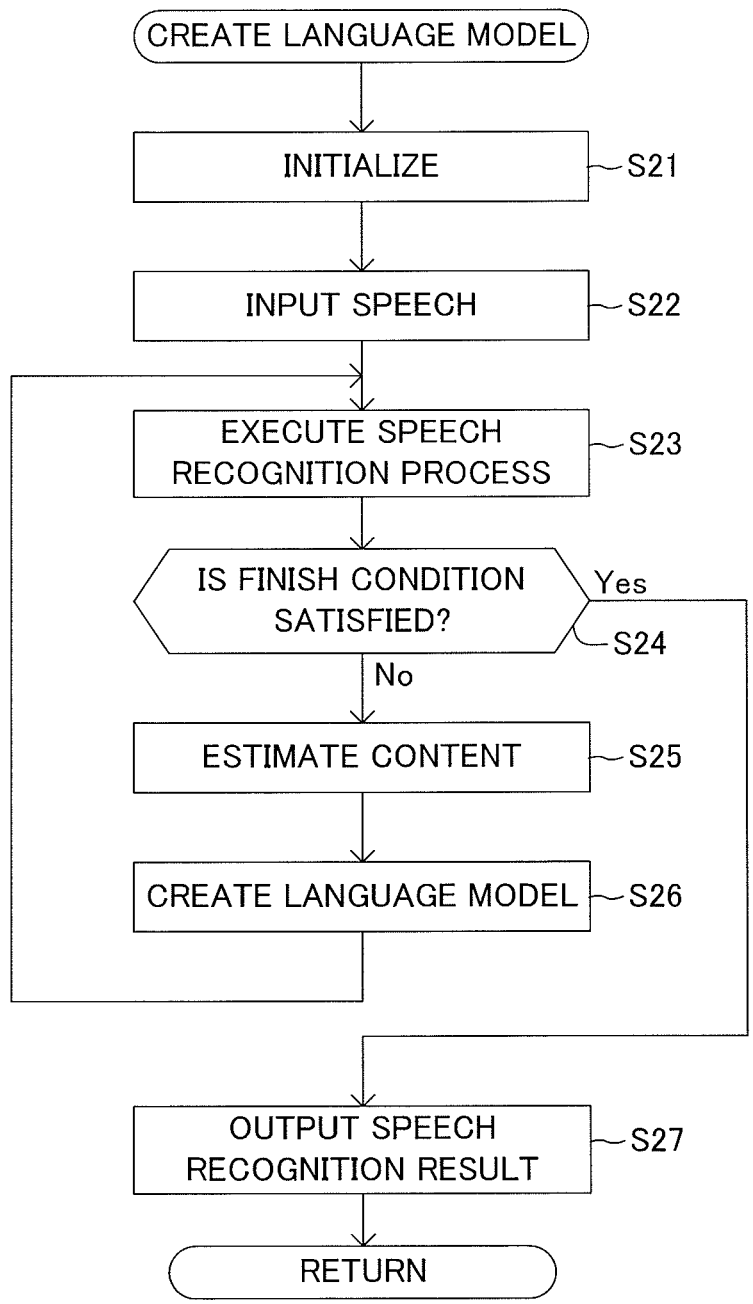

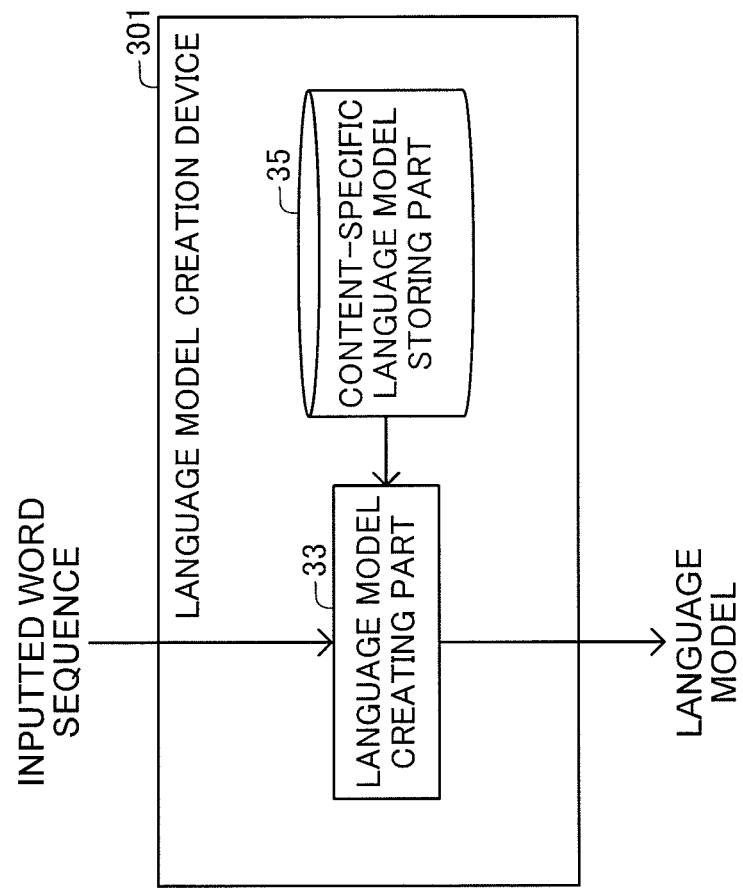

LANGUAGE MODEL CREATION DEVICE

CROSS REFERENCE TO RELATED APPLICATIONS

This application is a National Stage of International Application No. PCT/JP2009/004341 filed Sep. 3, 2009, claiming priority based on Japanese Patent Application No. 2008-304564, filed Nov. 28, 2008, the contents of all of which are incorporated herein by reference in their entirety.

TECHNICAL FIELD

The present invention relates to a language model creation device that creates a language model used for executing a speech recognition process of recognizing a word sequence corresponding to a speech.

BACKGROUND ART

A speech recognition device that, from a speech (an utterance) uttered by a user, recognizes a word sequence represented by the speech is known. As one of this kind of speech recognition device, a speech recognition device described in Patent Document 1 executes a speech recognition process of recognizing a word sequence corresponding to a speech based on a plurality of previously stored content-specific language models.

A content-specific language model is a model representing a probability that a specific word appears in a word sequence representing a specific content (a topic, a keyword, or the like). For example, a probability that the name of a program or the name of a personality appears is high in a word sequence about a TV program, and a probability that the name of a team, the name of sporting goods or the name of a player appears is high in a word sequence about sports.

There is a case that the content changes in a series of speeches uttered by a user. In this case, if a speech recognition process is executed based on only one content-specific language model, there is a fear that the accuracy of recognition of a word sequence become extremely low.

Accordingly, the speech recognition device described above is configured to use content-specific language models different for each predetermined section in one utterance.
[Patent Document 1] Japanese Unexamined Patent Application Publication No. JP-A 2002-229589

However, the speech recognition device described above has a problem that, in a case that the content of a content-specific language model used in the abovementioned section does not coincide with the content of an actual utterance, the accuracy of recognition of a word sequence becomes extremely low.

Further, for determining which one of the content-specific language models should be used, the speech recognition device executes a process of evaluating the result of recognition when using each of the content-specific language models. Therefore, the speech recognition device described above has a problem that processing load for determining which one of the content-specific language models should be used is excessively large.

SUMMARY

Accordingly, an object of the present invention is to provide a language model creation device capable of solving the aforementioned problems, "calculation load for creating a language model becomes excessively large" and "there is a case that it is impossible to recognize a word sequence from a speech with high accuracy."

In order to achieve the abovementioned object, a language model creation device as an exemplary embodiment of the present invention comprises:

a content-specific language model storing means configured to store a first content-specific language model representing a probability that a specific word appears in a word sequence representing a first content, and a second content-specific language model representing a probability that the specific word appears in a word sequence representing a second content; and a language model creating means configured to execute a language model creation process of:

acquiring a first probability parameter representing a probability that a content represented by a target word sequence that is at least part of an inputted word sequence, which is a word sequence included in a speech recognition hypothesis generated by execution of a speech recognition process of recognizing a word sequence corresponding to a speech and is a word sequence having been inputted, is the first content, and a second probability parameter representing a probability that the content represented by the target word sequence is the second content; and creating a language model representing a probability that the specific word appears in a word sequence corresponding to a part corresponding to the target word sequence of the speech, based on the acquired first probability parameter, the acquired second probability parameter, the stored first content-specific language model, and the stored second content-specific language model.

Further, a speech recognition device as another exemplary embodiment of the present invention comprises:

a content-specific language model storing means configured to store a first content-specific language model representing a probability that a specific word appears in a word sequence representing a first content, and a second content-specific language model representing a probability that the specific word appears in a word sequence representing a second content;

a language model creating means configured to execute a language model creation process of:

acquiring a first probability parameter representing a probability that a content represented by a target word sequence that is at least part of an inputted word sequence, which is a word sequence included in a speech recognition hypothesis generated by execution of a speech recognition process of recognizing a word sequence corresponding to a speech and is a word sequence having been inputted, is the first content, and a second probability parameter representing a probability that the content represented by the target word sequence is the second content; and creating a language model representing a probability that the specific word appears in a word sequence corresponding to a part corresponding to the target word sequence of the speech, based on the acquired first probability parameter, the acquired second probability parameter, the stored first content-specific language model, and the stored second content-specific language model; and a speech recognizing means configured to execute a speech recognition process of recognizing a word sequence corresponding to an inputted speech, based on the language model created by the language model creating means.

Further, a language model creation method as another exemplary embodiment of the present invention, comprising, in a case that a first content-specific language model representing a probability that a specific word appears in a word sequence representing a first content and a second content-specific language model representing a probability that the specific word appears in a word sequence representing a second content are stored in a storing device:

acquiring a first probability parameter representing a probability that a content represented by a target word sequence that is at least part of an inputted word sequence, which is a word sequence included in a speech recognition hypothesis generated by execution of a speech recognition process of recognizing a word sequence corresponding to a speech and is a word sequence having been inputted, is the first content, and a second probability parameter representing a probability that the content represented by the target word sequence is the second content; and creating a language model representing a probability that the specific word appears in a word sequence corresponding to a part corresponding to the target word sequence of the speech, based on the acquired first probability parameter, the acquired second probability parameter, the stored first content-specific language model, and the stored second content-specific language model.

Further, a language model creation program as another exemplary embodiment of the present invention comprises instructions for causing an information processing device to realize:

a content-specific language model storing processing means configured to cause a storing device to store a first content-specific language model representing a probability that a specific word appears in a word sequence representing a first content, and a second content-specific language model representing a probability that the specific word appears in a word sequence representing a second content; and a language model creating means configured to:

acquire a first probability parameter representing a probability that a content represented by a target word sequence that is at least part of an inputted word sequence, which is a word sequence included in a speech recognition hypothesis generated by execution of a speech recognition process of recognizing a word sequence corresponding to a speech and is a word sequence having been inputted, is the first content, and a second probability parameter representing a probability that the content represented by the target word sequence is the second content; and create a language model representing a probability that the specific word appears in a word sequence corresponding to a part corresponding to the target word sequence of the speech, based on the acquired first probability parameter, the acquired second probability parameter, the stored first content-specific language model, and the stored second content-specific language model.

With the configurations as described above of the present invention, it is possible to create a language model that makes it possible to recognize a word sequence corresponding to a speech with high accuracy while preventing calculation load from becoming excessively large.

BRIEF DESCRIPTION OF DRAWINGS

FIG. 2 is a flow chart showing an operation of the language model creation device shown in FIG. 1;

FIG. 3 is an explanation view conceptually showing an example of a word sequence of a speech recognition hypothesis;

FIG. 4 is an explanation view conceptually showing an example of a content candidate graph;

FIG. 5 is an explanation view showing an example of the features of a content;

FIG. 6 is an explanation view showing an example of features used in CRF as an example of a content model;

FIG. 10 is a flow chart showing an operation of the speech recognition device shown in FIG. 9; and FIG. 11 is a block diagram schematically showing a function of a language model creation device according to a third exemplary embodiment of the present invention.

EXEMPLARY EMBODIMENT

Below, respective exemplary embodiments of a language model creation device, a speech recognition device, a language model creation method and a language model creation program according to the present invention will be described with reference to FIGS. 1 to 11.

First Exemplary Embodiment

Configuration

Figure 1:
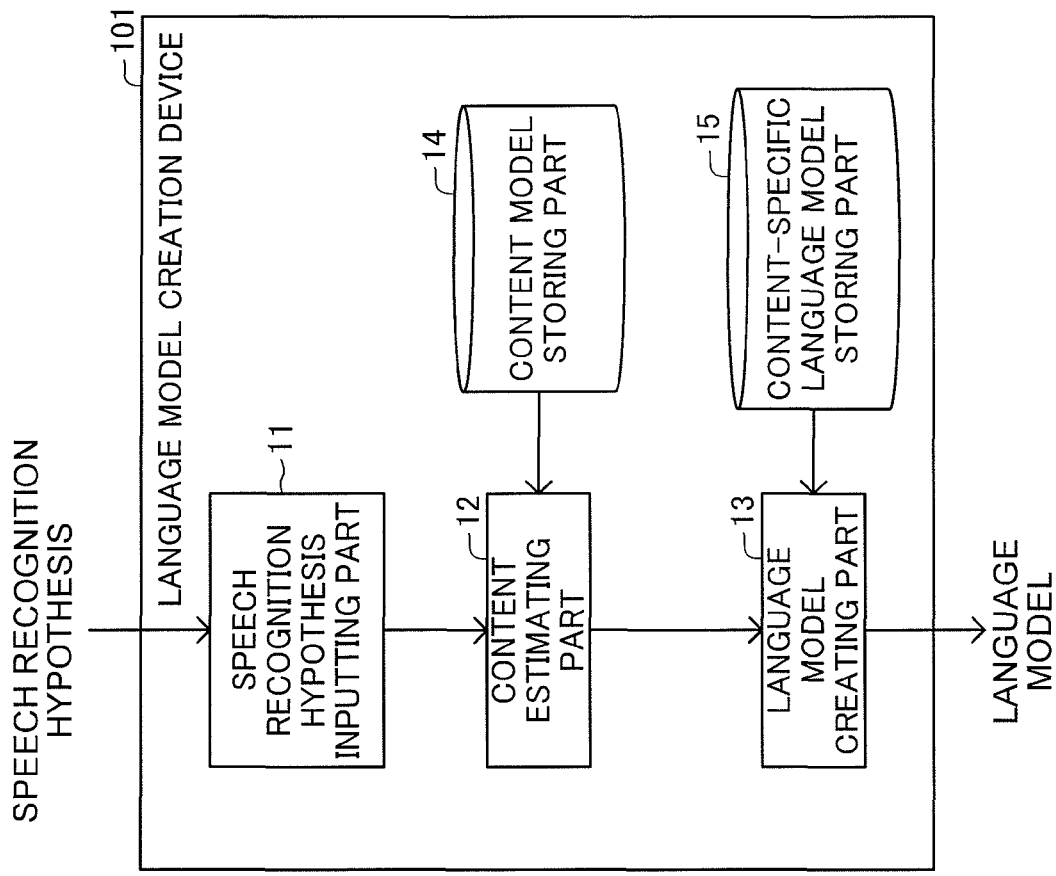
FIG. 1 is a block diagram schematically showing a function of a language model creation device according to a first exemplary embodiment of the present invention.
Figure 7:
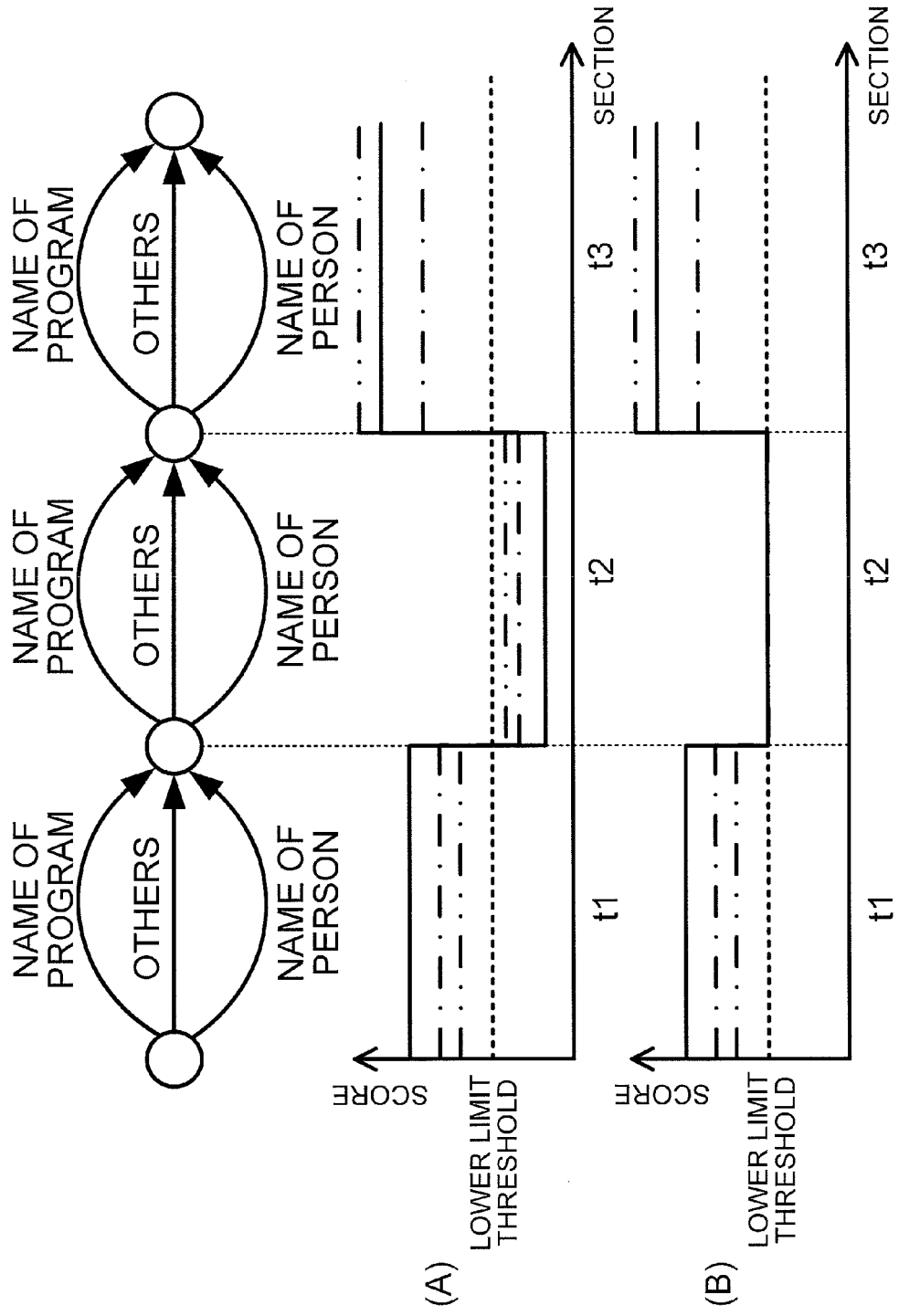
FIG. 7 is an explanation view conceptually showing an example of a score acquired for a target word sequence.
Figure 8:
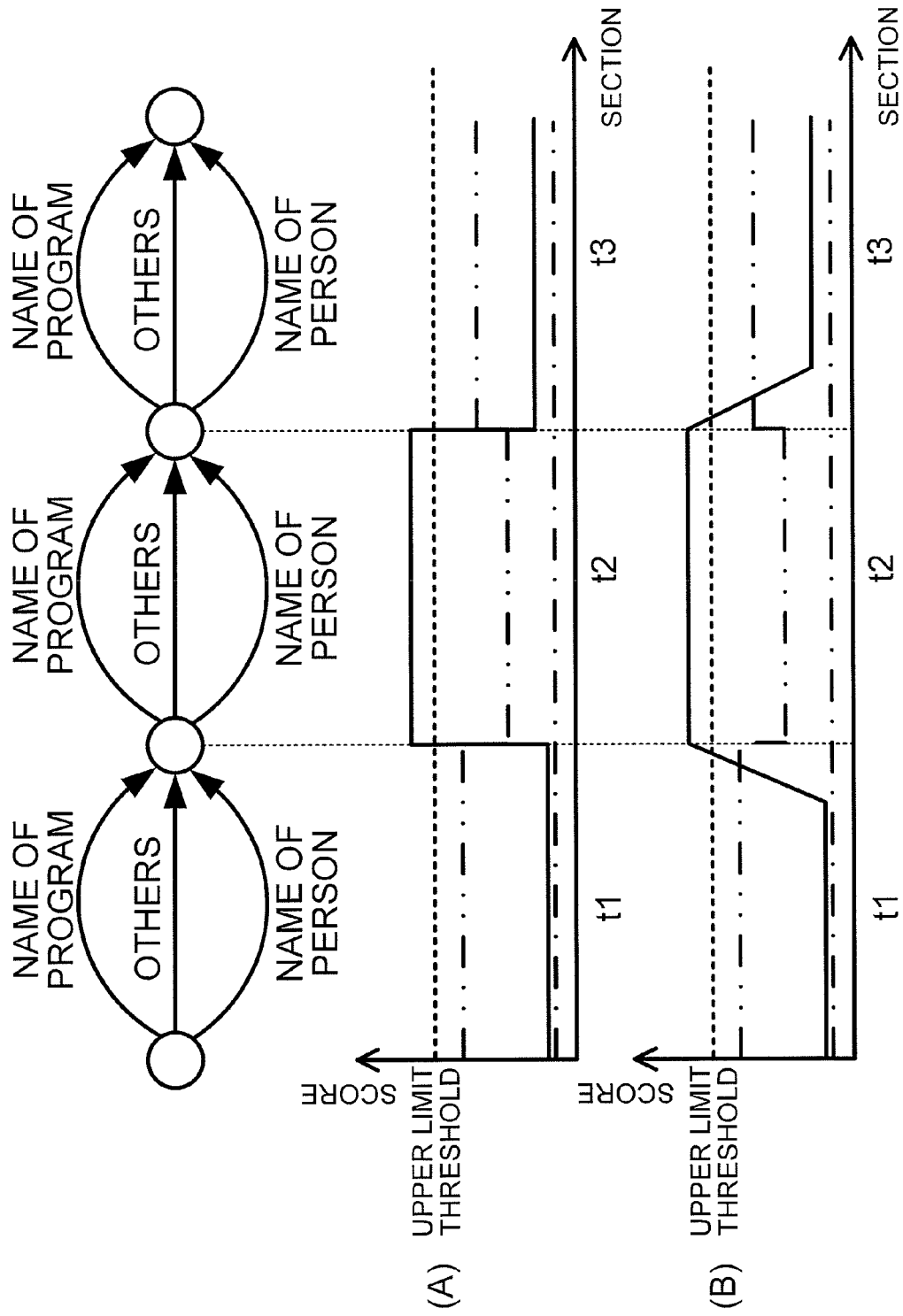
FIG. 8 is an explanation view conceptually showing an example of a score acquired for a target word sequence.

With reference to FIG. 1, a language model creation device 101 according to a first exemplary embodiment of the present invention will be described. The language model creation device 101 is an information processing device. The language model creation device 101 is provided with a CPU (Central Processing Unit), a storing device (a memory and an HDD (Hard Disk Drive)), an input device and an output device, which are not shown in the drawings.

The output device has a display. The output device causes the display to display an image composed of characters and figures based on image information outputted by the CPU.

The input device has a mouse, a keyboard, and a microphone. The language model creation device 101 is configured so that information based on an operation by the user is inputted via the keyboard and the mouse. The language model creation device 101 is configured so that inputted speech information representing a speech around the microphone (i.e., outside the language model creation device 101) is inputted via the microphone.

In this exemplary embodiment, the language model creation device 101 is configured to accept a speech recognition hypothesis (an inputted word sequence) including a word sequence as a speech recognition result outputted by a not-shown speech recognition device, and output a language model corresponding to the accepted speech recognition hypothesis to the speech recognition device.

(Function)

Next, a function of the language model creation device 101 configured as described above will be described.

As shown in FIG. 1, the function of the language model creation device 101 includes a speech recognition hypothesis inputting part 11 (part of a language model creating means), a content estimating part 12 (part of the language model creating means), a language model creating part 13 (part of the language model creating means), a content model storing part 14 (part of the language model creating means), and a content-specific language model storing part 15 (a content-specific language model storing means, a content-specific language model storing processing means, a content-specific language model storing processing step). This function is realized by execution of a program stored in the storing device by the CPU of the language model creation device 101. This function may be realized by hardware such as a logic circuit.

The speech recognition hypothesis inputting part 11 accepts a speech recognition hypothesis (an inputted word sequence) including a word sequence as a speech recognition result outputted by an exterior speech recognition device (not shown), and output the accepted speech recognition hypothesis to the content estimating part 12. A speech recognition hypothesis is information generated by execution of a speech recognition process of recognizing a word sequence corresponding to a speech by a speech recognition device. In this exemplary embodiment, a speech recognition hypothesis is information representing a word sequence composed of one or more words. A speech recognition hypothesis may be information representing a plurality of word sequences (e.g., a word graph, an N-best word sequence (N-pieces of best words), or the like).

The content estimating part 12 divides the speech recognition hypothesis outputted by the speech recognition hypothesis inputting part 11 on a border between words of the word sequence recognized in the speech recognition process, thereby extracting (generating) at least one target word sequence from the speech recognition hypothesis. Thus, when creating a language model, it is possible to utilize information acquired when executing the speech recognition process. As a result, it is possible to estimate the content with accuracy, and it is possible to rapidly create a language model.

Further, the content estimating part 12 may divide the speech recognition hypothesis at a position different from a border between words of the word sequence recognized in the speech recognition process, thereby extracting (generating) at least one target word sequence from the speech recognition hypothesis. Thus, even if a border between actual words in an utterance is different from the border between the words of the word sequence recognized in the speech recognition process, it is possible to create a language model that makes it possible to recognize a word sequence corresponding to a speech with high accuracy.

For each of a plurality of target word sequences having been generated, the content estimating part 12 calculates (acquires) a probability parameter (a first probability parameter, a second probability parameter, or the like) representing a probability that the content represented by the target word sequence is a specific content (a first content, a second content, or the like), based on the content model stored in the content model storing part 14. For example, the content estimating part 12 calculates the first probability parameter representing a probability that a content represented by a target word sequence is the first content, and calculates the second probability parameter representing that the content is the second content. The content estimating part 12 then outputs the acquired probability parameters to the language model creating part 13.

In this exemplary embodiment, a probability parameter is the value of a probability that a content represented by a target word sequence is a specific content. Such a value that becomes larger as the probability that the content represented by the target word sequence is the specific content can be a probability parameter. That is to say, a probability parameter represents likelihood that the content represented by the target word sequence is the specific content. A probability parameter may be referred to as a likelihood parameter or a weight parameter.

Here, a content is also referred to as a topic. For example, a content used as a search condition for searching for a TV program is a personal name (a personality name, a group name, etc.), a program name, a program genre name (variety, sport, etc.), a broadcast station name, a time expression (evening, eight o'clock, etc.), and so on. A probability that a specific word sequence appears (exists) in an utterance vary depending on contents.

Thus, for each section (target word sequence) in an utterance, the content estimating part 12 estimates a probability that a content represented by the word sequence in the section is a specific word. Therefore, even if the content changes in the utterance, it is possible to estimate the probability with high accuracy for each section.

The content model storing part 14 has the storing device previously store a content model (information) representing a relation between a word sequence and a probability that a content represented by the word sequence is each of a plurality of contents. In this exemplary embodiment, a content model is a probability model based on the theory of CRF (Conditional Random Fields). A content model is expressed by the following equation.

[Equation 1]

$$P(Y \mid X) = \frac{\exp(\Lambda \cdot \Phi(X, Y))}{Z} \qquad (1)$$

Here, "X" represents a target word sequence, and "Y" represents a content. That is to say, the right side $P(Y|X)$ of the equation 1 represents a probability that a content represented by the target word sequence X is the content Y.

Further, "$\Phi(X,Y)$" is information representing a feature of the target word sequence X, and "$\Lambda$" is a model parameter (a weight value) in the CRF corresponding to each of the features $\Phi(X,Y)$. Moreover, "Z" is a normalization term. Here, "exp( )" represents a function to obtain a power of a numerical value with e the base.

Therefore, in this exemplary embodiment, the content model storing part 14 has the storing device store the feature $\Phi$ and the model parameter $\Lambda$ (the weight value).

An example of a method by which the content estimating part 12 estimates a content represented by each word of a speech recognition hypothesis (a content to which each word belongs) in a case that the speech recognition hypothesis is a word sequence and CRF is used as a content model will be described.

Firstly, the content estimating part 12 expands a section corresponding to each word included in the word sequence of the speech recognition hypothesis to content candidates, and holds in the form of a graph (a content candidate graph). FIG. 3 shows an example of the word sequence of the speech recognition hypothesis, and FIG. 4 shows an example of the content candidate graph.

For example, assuming a speech recognition hypothesis of an utterance "inagakigorou no deteiru dorama wo mitai" is "inakakikou no deteiru dorama wo mitai," a description will be made. FIG. 3 shows part of the word sequence of the speech recognition hypothesis. As shown in FIG. 4, the content estimating part 12 generates content candidates by expanding each section to three kinds, "personal name" "program name," and "others." An arc (an edge) A in FIG. 4 represents that the content represented by the word "inakakikou" in the speech recognition hypothesis is "personal name."

Next, the content estimating part 12 ranks the paths of contents (content paths) represented by the content candidate graph based on a predetermined criterion (e.g., a score calculated with reference to the content model), and outputs. To be specific, the content estimating part 12 obtains scores with reference to the content model for each arc in the graph, and accumulates the scores for each path.

The content estimating part 12 specifies such a path that the left side P(Y|X) of the equation 1 becomes the maximum, by search using Viterbi algorithm. Moreover, the content estimating part 12 specifies a higher path having been ranked, by A*search. When outputting information representing the specified path, the content estimating part 12 may apply a process of, in a case that the same contents continue, gathering the contents, for example.

A score for each arc in the content candidate graph is the product of a feature regarding each arc and a weight value for each feature as a model parameter of CRF.

With the arc A of the content candidate graph of FIG. 4 as an example, an example of a method of obtaining a score for the arc will be described.

FIG. 5 shows an example of a feature regarding the arc A. FIG. 6 shows an example of expression of the feature of FIG. 5 as the feature of the content model. For example, it is assumed that a speech recognition hypothesis of a section corresponding to a temporal section of a certain arc A has features such as "part of speech=noun" and "collocation=appear" when the content is "personal name." In this case, these features are used as the features used for the content model.

It is assumed that a word sequence corresponding to the arc A has features such as "part of speech=noun" and "collocation=appear" as shown in FIG. 5. These features are each expressed as the feature ($\Phi$) of CRF as shown in FIG. 6. By multiplying a value of each of the features and the weight $\Lambda$ of "personal name" corresponding to the arc A of the model parameter, a score of the arc A is calculated. The larger the score is, the higher the likelihood of the content is.

In this exemplary embodiment, as the feature ($\Phi$) of the content model, a linguistic feature (e.g., a word surface, how to read, a part of speech) in a section corresponding to an arc from which a score is obtained is used. In other words, the content estimating part 12 acquires a probability parameter based on word attribute information representing the attribute of a word included in a target word sequence. Word attribute information includes at least one of information representing a word surface, information representing how to read, and information representing a part of speech.

As the feature ($\Phi$) of the content model, for example, a feature (recognition reliability, the length of duration, the presence/absence of an antecedent silence, etc.) relating to a speech recognition process may be used. In other words, the content estimating part 12 may acquire a probability parameter based on speech recognition process information acquired when executing a speech recognition process of recognizing a target word sequence from a speech. Speech recognition process information includes at least one of information representing recognition reliability as the reliability of the result of recognition by a speech recognition process, information representing the length of duration as a time period that one sound continues, and information representing the presence/absence of an antecedent silence.

Further, it is possible to also use the abovementioned features regarding sections before and after a target arc and a section overlapping a target arc in a word graph or in an N-best word sequence.

Further, not only a local feature regarding a target section, but also a global feature regarding a whole speech recognition hypothesis (a whole utterance), i.e., information on a position in a speech recognition hypothesis (anterior half, posterior half, etc.), collocation word information in an utterance, information on the structure of a word graph (the average branching number of an arc, etc.), connective information of contents, and so on may be used as the feature ($\Phi$) of the content model. In other words, the content estimating part 12 may acquire a probability parameter based on at least one of information representing a position of a target word sequence in an inputted word sequence, information representing that an inputted word sequence includes multiple pieces of a certain word, information representing a connective state of contents in an inputted word sequence, and information representing a relation between inputted word sequences in a case that there are a plurality of inputted word sequences.

A posterior appearance probability (a posterior probability) p(Yi=c|X) of each arc of a content candidate graph is calculated by a recursive calculation using Forward algorithm and Backward algorithm. Here, "Yi=c" represents that a content represented by a word sequence in an $i^{th}$ section is a content "c." The content estimating part 12 uses this probability p as an appearance probability (a probability parameter) of each content in the section.

The model parameter of CRF may be optimized (learned) by an iterative calculation method or the like in accordance with a criterion that maximizes the log likelihood of the abovementioned equation 1 with a previously associated pair of an input (X: a word sequence) and an output (Y: content) as learning data.

The details of the identification method using CRF, the method of calculating a posterior probability of an identification result and the method of learning a model parameter as mentioned above are described in Non-patent Document "J. Lafferty, A. McCallum, F. Pereira, "Conditional Random Fields: Probabilistic Models for Segmenting and Labeling Sequence Data" Proceedings of $18^{th}$ International Conference on Machine Learning (ICML 2001), p 282-p 289, 2001," for example.

Based on the result of estimation of a content including a probability parameter (e.g., the first probability parameter and the second probability parameter) outputted by the content estimating part 12 and a content-specific language model stored in the content-specific language model storing part 15, the language model creating part 13 executes a language model creation process of creating a language model representing a probability that a specific word appears in a word sequence corresponding to a part corresponding to a target word sequence of a speech as the base of an inputted word sequence, on each target word sequence. The language model creating part 13 then outputs the created language model. In this exemplary embodiment, the content-specific language model and the language model are N-gram language models, which are models constructed based on the assumption that a probability of appearance of a certain word depends on only N-1 pieces of words immediately before the certain word.

In an N-gram language model, the appearance probability of an $i^{th}$ word $w_i$ is expressed by $P(w_i|W_{i-N+1}^{i-1})$. Here, the condition part $W_{i-N+1}^{i-1}$ represents $(i-N+1)^{th}$ to $(i-1)^{th}$ word sequences. A model with N=2 is referred to as a bigram model, and a model with N=3 is referred to as a trigram model. Moreover, a model constructed based on an assumption that is not influenced by an immediately preceding word is referred to as a unigram model.

With an N-gram language model, a probability $P(W_1^n)$ that a word sequence $W_1^n=(w_1, w_2, \ldots, w_n)$ appears is expressed by the following equation 2. Moreover, such a parameter formed by various conditional probabilities of various words used in an N-gram language model is obtained by maximum likelihood estimation with respect to text data for learning.

[Equation 2]

$$P(W_1^n) = \prod_i P(w_i \mid W_{i-N+1}^{i-1}) \quad (2)$$

The content-specific language model storing part 15 has a storing device previously store a plurality of content-specific language models. The plurality of content-specific language models are models representing probabilities that a specific word appears in word sequences representing different contents. That is to say, the plurality of content-specific language models include a first content-specific language model representing a probability that a specific word appears in a word sequence representing a first content, and a second content-specific language model representing a probability that the specific word appears in a word sequence representing a second content. In this exemplary embodiment, the respective content-specific language models are trigram models.

The language model creating part 13 creates a language model in accordance with the following equation 3 from a score with respect to each content in each section (i.e., a probability parameter representing a probability that a content represented by each target word sequence is the each content) and the plurality of content-specific language models stored in the content-specific language model storing part 15.

[Equation 3]

$$P_t(w_i) = \sum_j \alpha_j(t) P_j(w_i) \quad (3)$$

In the equation 3, $P_t(w_i)$ represents a probability that a word $w_i$ appears in a section "t," $\alpha_j(t)$ represents a probability parameter (a score) representing a probability (an appearance probability of a content) that a content represented by a word sequence in the section "t" is a content "j," and $P_j(w_i)$ represents a probability that the word $w_i$ appears in a content-specific language model for the content "j." In this exemplary embodiment, the language model creating part 13 uses a probability parameter (an appearance probability of a content in each section (target word sequence) in an utterance) acquired by the content estimating part 12, as $\alpha_j(t)$ of the equation 3.

Thus, the language model creating part 13 creates a language model that: the larger the sum of a value obtained by multiplying a first coefficient (e.g., a first probability parameter) that becomes larger as a calculated first probability parameter becomes larger by a probability ($P_j(w_i)$) of the equation 3) represented by the first content-specific language model and a value obtained by multiplying a second coefficient (e.g., a second probability parameter) that becomes larger as a calculated second probability parameter becomes larger by a probability represented by the second content-specific language model becomes, the larger a probability that a specific word appears in a word sequence corresponding to a part corresponding to a target word sequence of a speech as the base of an inputted word sequence becomes.

Here, "t" of the equation 3 may represent a section corresponding to a temporal frame used in a speech recognition process, or may represent, for example, a time representing a time point in an utterance.

The content-specific language model storing part 15 may have the storing device store a content-specific language model and a list of words with high appearance probabilities for each content (a word list). In this case, the language model creating part 13 may be configured to increase a probability that a word included in the word list for a content of the largest score appears by a predetermined value in each section in an utterance.

The content estimating part 12 may be configured not to use a value estimated for each section as the aforementioned score (content appearance score) as it is but to change the value to use. For example, there is a case that a word sequence in a certain utterance includes a word sequence that is not related to any content. In this case, for example, the content estimating part 12 estimates the content represented by the word sequence from four kinds of contents: the three kinds of contents and a content "none of the contents." Then, in a section in which the content represented by the word sequence is estimated as the content "none of the contents," the content estimating part 12 may change the scores of the other three kinds of contents to predetermined values (e.g., values in accordance with a predetermined ratio (a fixed ratio)).

Further, in a case that all of the calculated probability parameters (scores) are smaller than a preset lower limit threshold, the content estimating part 12 may set all of the calculated probability parameters to the same values.

For example, a case that all of the calculated probability parameters (scores) in a certain section t2 are smaller than a lower limit threshold as shown in FIG. 7A will be assumed. In this case, the content estimating part 12 sets all of the probability parameters for the section t2 to the same values (the lower limit threshold in this exemplary embodiment) as shown in FIG. 7B.

According to this, it is possible to, in a section where the content represented by a target word sequence cannot be accurately specified, prevent creation of a language model on which only an influence of any of the content-specific language models is largely reflected. As a result, it is possible to create a language model that enables highly accurate recognition of a word sequence corresponding to a speech.

Further, for example, in a case that a content represented by a word sequence is "the name of a person" relating to a condition of search of a TV program, there is a relatively high possibility that a word such as "appear" or "come on" appears following the word sequence. Therefore, in a section following a section where the content represented by the word sequence is "the name of a person," in order to recognize a following word sequence with high accuracy, it is undesirable that the score of "the name of a person" immediately decreases.

Therefore, in a case that a probability parameter (e.g., the first probability parameter) acquired with respect to a certain target word sequence is larger than a preset upper limit threshold, the content estimating part 12 may correct so as to increase the probability parameter (e.g., the first probability parameter) acquired with respect to a target word sequence adjacent to the certain target word sequence.

For example, a case that a probability parameter (score) calculated in a certain section t2 is larger than a preset upper limit threshold as shown in FIG. 8A will be assumed. In this case, the content estimating part 12 corrects so as to increase scores acquired with respect to sections t1 and t3 adjacent to the section t2 as shown in FIG. 8B.

To be specific, the content estimating part 12 corrects the score so that the score of the section t1 in a portion closer to the section t2 becomes closer to the score acquired with respect to the section t2. In a like manner, the content estimating part 12 corrects the score so that the score of the section t3 in a portion closer to the section t2 becomes closer to the score acquired with respect to the section t2.

Thus, it is possible to create a language model that enables highly accurate recognition of a word sequence corresponding to a speech even in a section adjacent to a section where the content represented by a target word sequence is specified with relatively high accuracy.

When outputting a created language model, the language model creating part 13 may output all information included in the language model, or may output only information designated from outside.

(Operation)

Next, an operation of the language model creation device 101 of the first exemplary embodiment of the present invention will be described with reference to a flow chart shown in FIG. 2.

As shown in FIG. 2, when started, the language model creation device 101 reads out a content model and a content-specific language model from the storing devices realizing the content model storing part 14 and the content-specific language model storing part 15, and executes an initializing process for referring to the respective models from the content estimating part 12 and the language model creating part 13 (step S11).

On the other hand, in response to a notice representing the finish of a speech recognition process, the speech recognition hypothesis inputting part 11 accepts a speech recognition hypothesis from an external speech recognition device, and outputs the accepted speech recognition hypothesis to the content estimating part 12 (step S12, part of a language model creation step). The speech recognition hypothesis inputting part 11 may be configured to accept a speech recognition hypothesis inputted by the user.

When a speech recognition hypothesis is inputted via the speech recognition hypothesis inputting part 11, the content estimating part 12 calculates, based on the content model stored by the content model storing part 14, a probability parameter representing a probability that the content represented by each target word sequence (e.g., each word) in the speech recognition hypothesis is a specific content (step S13, part of the language model creation step).

Next, based on the probability parameter outputted by the content estimating part 12 and the content-specific language model stored by the content-specific language model storing part 15, the language model creating part 13 creates a language model representing a probability that the specific word appears in a word sequence corresponding to a part corresponding to the target word sequence in the speech as the base of the speech recognition hypothesis, and outputs the created language model (step S14, part of the language model creation step).

As described above, in the first exemplary embodiment of the language model creation device according to the present invention, the language model creation device 101 creates a language model based on a probability that the content represented by a target word sequence is a first content, a probability that the content represented by the target word sequence is a second content, a first content-specific language model, and a second content-specific language model.

Consequently, it is possible to avoid creation of a language model based on only a content-specific language model relating to a different content from the content represented by a target word sequence. That is to say, it is possible to create a language model by securely using a content-specific language model relating to the content represented by a target word sequence. As a result, it is possible to create a language model that enables highly accurate recognition of a word sequence corresponding to a speech.

Further, the abovementioned configuration eliminates the need for, when determining which one of content-specific language models should be used, evaluating a recognition result in the case of using the respective content-specific language models, it is possible to decrease processing load of the language model creation device 101.

That is to say, the language model creation device 101 described above is capable of creating a language model that makes it possible to recognize a word sequence corresponding to a speech with high accuracy while preventing calculation load from becoming excessive.

Further, according to the first exemplary embodiment, it is possible to make a degree larger that a probability represented by a first content-specific language model is reflected on a language model, as a probability that the content represented by a target word sequence is a first content becomes larger. In a like manner, it is possible to make a degree larger that a probability represented by a second content-specific language model is reflected on a language model, as a probability that the content represented by a target word sequence is a second content becomes larger. As a result, it is possible to create a language model that enables highly accurate recognition of a word sequence corresponding to a speech.

Second Exemplary Embodiment

Figure 9:
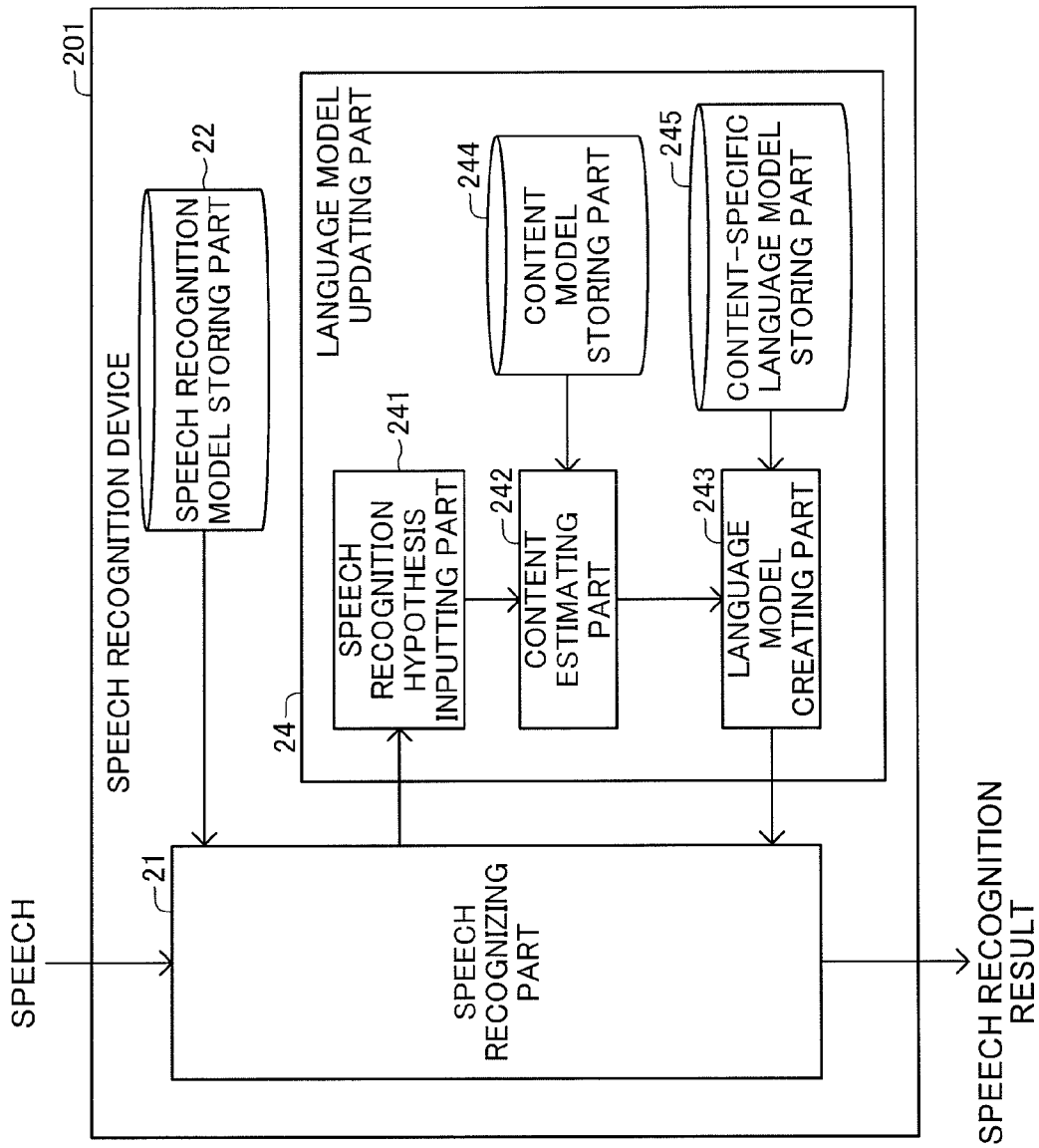
FIG. 9 is a block diagram schematically showing a function of a speech recognition device according to a second exemplary embodiment of the present invention.

Next, with reference to FIG. 9, a speech recognition device according to a second exemplary embodiment of the present invention will be described. FIG. 9 is a block diagram showing a function of a speech recognition device 201 according to the second exemplary embodiment of the present invention.

The speech recognition device 201 is an information processing device having a like configuration as the language model creation device 101 of the first exemplary embodiment. The function of the speech recognition device 201 includes a speech recognizing part (a speech recognizing means) 21, a speech recognition model storing part 22, and a language model updating part (a language model creating means) 24.

The speech recognition device 201 executes a speech recognition process of recognizing a word sequence corresponding to an inputted speech to thereby generate a speech recognition hypothesis as an inputted word sequence, creates a language model in a like manner as the language model creation device 101 of the first exemplary embodiment based on the generated speech recognition hypothesis, and executes the speech recognition process based on the created language model again.

The speech recognizing part 21 executes the speech recognition process of recognizing a word sequence corresponding to a speech inputted via an input device, thereby generating an inputted word sequence as a speech recognition hypothesis (e.g., a word graph). The speech recognizing part 21 may be configured so that a speech is inputted by reception of speech information representing a speech from another information processing device. The speech recognizing part 21 executes a speech recognition process by searching for a word sequence matching a speech, in accordance with a score calculated based on a model stored by the speech recognition model storing part 22 (a model that is for executing the speech recognition process and includes an acoustic model, a language model, a word dictionary, etc.), with respect to all sections of an utterance. In this exemplary embodiment, an acoustic model is a Hidden Markov Model, and a language mode is a word trigram.

When executing a speech recognition process, the speech recognizing part 21 refers to a language model outputted by the language model updating part 24. For example, in the case of calculating a probability that a word $w_i$ appears with reference to the language model of the equation 3 in a certain time frame "f" during the speech recognition process, the speech recognizing part 21 refers to $P_t(w_i)$ with respect to a section "t" corresponding to the time frame "f." In this exemplary embodiment, a time frame represents a unit at the time of conversion of a speech to be recognized into a feature for recognition.

In the case of executing a speech recognition process before a language model corresponding to an utterance is created by the language model updating part 24, the speech recognizing part 21 refers to the language model stored by the speech recognition model storing part 22. The speech recognizing part 21 may be configured to use the sum of probabilities represented by a plurality of content-specific language models stored by the content-specific language model storing part 245, as a probability that a word appears.

The speech recognition device 201 executes an iterative process of alternately repeating the speech recognition process that the speech recognizing part 21 recognizes a word sequence corresponding to an inputted speech based on a language model created by the language model updating part 24, and a language model creation process that the language model updating part 24 creates a language model based on the word sequence recognized by the speech recognizing part 21.

As the accuracy of an inputted word sequence (the degree of coincidence with an actual word sequence) becomes higher, it is possible to acquire the first probability parameter and the second probability parameter with higher accuracy. Moreover, as the accuracy of the first probability parameter and the second probability parameter becomes higher, it is possible to create a language model that enables highly accurate recognition of a word sequence corresponding to a speech. Therefore, the abovementioned configuration makes it possible to recognize a word sequence corresponding to a speech with still higher accuracy.

The speech recognizing part 21 finishes the iterative process in a case that a predetermined finish condition is satisfied based on the generated speech recognition hypothesis or the language model used in the speech recognition process. After finishing the iterative process, the speech recognizing part 21 outputs the latest speech recognition hypothesis acquired at the point as a speech recognition result. The speech recognizing part 21 may output a speech recognition result by selecting from speech recognition hypotheses accumulated by the point.

The finish condition is such a condition that a word sequence recognized in the previous speech recognition process coincides with a word sequence recognized in the present speech recognition process. The finish condition may be such a condition that the number of times of execution of the speech recognition process is larger than a preset threshold number of times. The finish condition may be a condition determined based on a parameter of a language model created by the language model creating part 243, or an estimation result outputted by the content estimating part 242 or the score thereof.

The language model updating part 24 has a like function as the language model creation device 101 of the first exemplary embodiment.

The language model updating part 24 includes a speech recognition hypothesis inputting part 241 similar to the speech recognition hypothesis inputting part 11, a content estimating part 242 similar to the content estimating part 12, a language model creating part 243 similar to the language model creating part 13, a content model storing part 244 similar to the content model storing part 14, and a content-specific language model storing part 245 (a content-specific language model storing means, a content-specific language model storing processing means, a content-specific language model storing processing step) similar to the content-specific language model storing part 15.

In a case that the speech recognizing part 21 determines that the finish condition is not satisfied, the language model updating part 24 creates a language model based on the speech recognition hypothesis outputted by the speech recognizing part 21, the stored content model and the stored content-specific language model, and outputs the created language model.

In this exemplary embodiment, the content-specific language model storing part 245 has a storing device store a word trigram as a content-specific language model. The language model creating part 243 creates a language model for each target word sequence, based on a score representing a probability that the content represented by the target word sequence is a specific content, the stored content-specific language model, and the equation 3.

Every time accepting a speech recognition hypothesis from the speech recognizing part 21, the language model updating part 24 creates a language model based on the accepted speech recognition hypothesis until the speech recognizing part 21 determines that the finish condition is satisfied. A probability that a word $w_i$ appears in a language model created for the $k^{th}$ time shall be $P_{t,k}(w_i)$ (refer to the following equation 4). The speech recognizing part 21 executes a $(k+1)^{th}$ speech recognition process with reference to this language model, and outputs a speech recognition hypothesis.

[Equation 4]

$$P_{t,k}(w_i) = \sum_j \alpha_{j,k}(t) P_j(w_i) \qquad (4)$$

Then, the content estimating part 242 inputs this speech recognition hypothesis, and outputs an appearance score $\alpha_{j,k+1}(t)$ of each content as the result of the $(k+1)^{th}$ content estimation. The language model creating part 243 creates a $(k+1)^{th}$ language model $P_{t,k+1}(wi)$ by using this appearance score (refer to the following equation 5). By thus repeatedly updating a speech recognition hypothesis and a content estimation result, the accuracy of each is gradually increased.

[Equation 5]

$$P_{t,k+1}(w_i) = \sum_j \alpha_{j,k+1}(t) P_j(w_i) \qquad (5)$$

In the abovementioned iterative process, in a case that the speech recognizing part 21 executes 2nd time and later processes, the speech recognizing part 21 may execute a rescore process with the previous speech recognition hypothesis (a word graph, etc.) as an input, instead of the speech recognition process with a speech as an input.

(Operation)

Next, an operation of the speech recognition device according to the second exemplary embodiment of the present invention will be described with reference to a flow chart shown in FIG. 10.

As shown in FIG. 10, when started, the speech recognition device 201 reads out a speech recognition model and a language model from the storing devices realizing the speech recognition model storing part 22 and the content-specific language model storing part 245, and executes an initializing process for referring to the respective models from the speech recognizing part 21 and the language model updating part 24 (step S21).

On the other hand, in response to a notice representing that an input of a speech is finished, the speech recognizing part 21 accepts the speech inputted from outside via an input device (step S22).

Upon acceptance of the speech, the speech recognizing part 21 executes a speech recognition process on the accepted speech based on the speech recognition model stored by the speech recognition model storing part 22 and a language model created by the language model updating part 24 (step S23).

The speech recognition device 201 determines whether a finish condition is satisfied or not based on a speech recognition hypothesis outputted by execution of the speech recognition process by the speech recognizing part 21 (step S24).

In a case that the finish condition is satisfied, the speech recognition device 201 determines "Yes," and outputs the latest speech recognition hypothesis acquired at the point, as a speech recognition result (step S27).

On the other hand, in a case that the finish condition is not satisfied, the speech recognition device 201 determines "No" at step S24 and executes processes at step S25 and step S26, thereby creating a language model. These processes are like processes as the processes at step S13 and step S14 of FIG. 2.

As described above, in the second exemplary embodiment of the speech recognition device according to the present invention, the speech recognition device 201 creates a language model based on a probability that the content represented by a target word sequence is the first content, a probability that the content represented by the target word sequence is the second content, the first content-specific language model, and the second content-specific language model. Then, the speech recognition device 201 executes a speech recognition process of recognizing a word sequence corresponding to a speech based on the created language model. Consequently, it is possible to recognize a word sequence corresponding to a speech with high accuracy while preventing calculation load of the speech recognition device 201 from becoming excessive.

Further, according to the second exemplary embodiment described above, it is possible to increase a degree that a probability represented by the first content-specific language model is reflected on the language model, as the probability that the content represented by the target word sequence is the first content becomes larger. In a like manner, it is possible to increase a degree that a probability represented by the second content-specific language model is reflected on the language model, as the probability that the content represented by the target word sequence is the second content becomes larger. As a result, it is possible to recognize a word sequence corresponding to a speech with high accuracy.

Additionally, the speech recognition device 201 executes an iterative process of alternately repeating a speech recognition process that the speech recognizing part 21 recognizes a word sequence corresponding to an inputted speech based on the language model created by the language model updating part 24 and a language model creation process that the language mode updating part 24 creates a language model based on the word sequence recognized by the speech recognizing part 21.

It is possible to acquire the first probability parameter and the second probability parameter with higher accuracy, as the accuracy of an inputted word sequence (the degree of coincidence with an actual word sequence) becomes higher. Moreover, it is possible to create a language model that enables highly accurate recognition of a word sequence corresponding to a speech, as the accuracy of the first probability parameter and the second probability parameter becomes higher. Therefore, according to the configuration described above, it is possible to recognize a word sequence corresponding to a speech with still higher accuracy.

Third Exemplary Embodiment

Next, a language model creation device according to a third exemplary embodiment of the present invention will be described with reference to FIG. 11.

A function of a language model creation device 301 according to the third exemplary embodiment includes a content-specific language model storing part (a content-specific language model storing means) 35, and a language model creating part (a language model creating means) 33.

The content-specific language model storing part 35 has a storing device store a first content-specific language model representing a probability that a specific word appears in a word sequence representing a first content, and a second content-specific language model representing a probability that the specific word appears in a word sequence representing a second content.

The language model creating part 33 acquires a first probability parameter representing a probability that a content represented by a target word sequence that is at least part of an inputted word, which is a word sequence included in a speech recognition hypothesis generated by execution of a speech recognition process of recognizing a word sequence corresponding to a speech and is a word sequence having been inputted, is the first content, and a second probability parameter representing a probability that the content represented by the target word sequence is the second content.

The language model creating part 33 executes a language model creation process of creating a language model representing a probability that a specific word appears in a word sequence corresponding to a part corresponding to a target word sequence of the speech, based on the acquired first probability parameter, the acquired second probability parameter, the first content-specific language model stored by the content-specific language model storing part 35, and the second content-specific language model stored by the content-specific language model storing part 35.

According to this, the language model creation device 301 creates a language model based on the probability that the content represented by the target word sequence is the first content, the probability that the content represented by the target word sequence is the second content, the first content-specific language model, and the second content-specific language model.

Consequently, it is possible to avoid creation of a language model based on only a content-specific language model relating to a different content from the content represented by the target word sequence. That is to say, it is possible to create a language model by securely using a content-specific language model relating to the content represented by the target word sequence. As a result, it is possible to create a language model that enables highly accurate recognition of a word sequence corresponding to a speech.

Further, since the configuration described above eliminates the need for, when determining which one of content-specific language models should be used, executing a process of evaluating the result of recognition in the case of using the respective content-specific language models, it is possible to decrease processing load of the language model creation device 301.

That is to say, with the language model creation device 301 described above, it is possible to create a language model that makes it possible to recognize a word sequence corresponding to a speech with high accuracy while preventing calculation load from becoming excessive.

In this case, it is preferred that the language model creating means is configured to create the language model that the larger a sum of a value obtained by multiplying a first coefficient becoming larger as the acquired first probability parameter becomes larger by the probability represented by the first content-specific language model and a value obtained by multiplying a second coefficient becoming larger as the acquired second probability parameter becomes larger by the probability represented by the second content-specific language model becomes, the larger the probability that the specific word appears in the word sequence corresponding to the part corresponding to the target word sequence of the speech becomes.

According to this, it is possible to increase a degree that a probability represented by the first content-specific language model is reflected on the language model, as the probability that the content represented by the target word sequence is the first content becomes larger. In a like manner, it is possible to increase a degree that a probability represented by the second content-specific language model is reflected on the language model, as the probability that the content represented by the target word sequence is the second content becomes larger. As a result, it is possible to recognize a word sequence corresponding to a speech with high accuracy.

In this case, it is preferred that the language model creating means is configured to execute the language model creation process on each of the plurality of target word sequences obtained by dividing the inputted word sequence on a border between words of the word sequence recognized in the speech recognition process.

According to this, when creating a language model, it is possible to utilize information acquired when executing a speech recognition process. As a result, it is possible to estimate the content with accuracy, and it is possible to rapidly create a language model.

Further, it is preferred that the language model creating means is configured to execute the language model creation process on each of the plurality of target word sequences obtained by dividing the inputted word sequence at a position different from a border between words of the word sequence recognized in the speech recognition process.

According to this, even if an actual border between words in a speech is different from a border between words of a word sequence recognized by a speech recognition process, it is possible to create a language model that enables recognition of a word sequence corresponding to a speech with high accuracy.

In this case, it is preferred that the language model creating means is configured to, in a case that both the acquired first probability parameter and the acquired second probability parameter are smaller than a preset lower limit threshold, set both the acquired first probability parameter and the acquired second probability parameter to same values.

According to this, it is possible to prevent, with respect to a speech section corresponding to a target word sequence whose content cannot be correctly specified, creation of such a language model that only an influence of any content-specific language model is largely reflected. As a result, it is possible to create a language model that enables recognition of a word sequence corresponding to a speech with high accuracy.

In this case, it is preferred that the language model creating means is configured to, in a case that both the acquired first probability parameter and the acquired second probability parameter are smaller than a preset lower limit threshold, set both the acquired first probability parameter and the acquired second probability parameter to same values.

According to this, it is possible to create a language model that enables highly accurate recognition of a word sequence corresponding to a speech, with respect to a speech section corresponding to a target word sequence adjacent to a target word sequence that the content is specified with relatively high accuracy.

In this case, it is preferred that the language model creating means is configured to, in a case that both the acquired first probability parameter and the acquired second probability parameter are smaller than a preset lower limit threshold, set both the acquired first probability parameter and the acquired second probability parameter to same values.

In this case, it is preferred that the language model creating means is configured to acquire the first probability parameter and the second probability parameter based on at least one of word attribute information representing an attribute of a word included in the target word sequence and speech recognition process information acquired at a time of execution of the speech recognition process of recognizing the target word sequence from the speech.

In this case, it is preferred that the language model creating means is configured to acquire the first probability parameter and the second probability parameter based on at least one of word attribute information representing an attribute of a word included in the target word sequence and speech recognition process information acquired at a time of execution of the speech recognition process of recognizing the target word sequence from the speech.

In this case, it is preferred that the speech recognition process information includes at least one of information representing recognition reliability that is reliability of a result of recognition by the speech recognition process, information representing a length of duration that is a time period during which one sound continues, and information representing presence/absence of an antecedent silence.

In this case, it is preferred that the language model creating means is configured to acquire the first probability parameter and the second probability parameter based on at least one of information representing a position of the target word sequence in the inputted word sequence, information representing that the inputted word sequence includes a plurality of same words, information representing a connective state of contents in the inputted word sequence, and information representing, in a case that there are the plurality of inputted word sequences, a relation between the inputted word sequences.

Further, s speech recognition device as another exemplary embodiment of the present invention comprises:

a content-specific language model storing means configured to store a first content-specific language model representing a probability that a specific word appears in a word sequence representing a first content, and a second content-specific language model representing a probability that the specific word appears in a word sequence representing a second content;

a language model creating means configured to execute a language model creation process of:

acquiring a first probability parameter representing a probability that a content represented by a target word sequence that is at least part of an inputted word sequence, which is a word sequence included in a speech recognition hypothesis generated by execution of a speech recognition process of recognizing a word sequence corresponding to a speech and is a word sequence having been inputted, is the first content, and a second probability parameter representing a probability that the content represented by the target word sequence is the second content; and creating a language model representing a probability that the specific word appears in a word sequence corresponding to a part corresponding to the target word sequence of the speech, based on the acquired first probability parameter, the acquired second probability parameter, the stored first content-specific language model, and the stored second content-specific language model; and a speech recognizing means configured to execute a speech recognition process of recognizing a word sequence corresponding to an inputted speech, based on the language model created by the language model creating means.

According to this, a speech recognition device creates a language model based on a probability that the content represented by a target word sequence is the first content, a probability that the content presented by the target word sequence is the second content, the first content-specific language model, and the second content-specific language model. Then, the speech recognition device executes a speech recognition process of recognizing a word sequence corresponding to a speech based on the created language model. Consequently, it is possible to recognize a word sequence corresponding to a speech with high accuracy while preventing calculation load of the speech recognition device from becoming excessive.

In this case, it is preferred that the language model creating means is configured to create the language model that the larger a sum of a value obtained by multiplying a first coefficient becoming larger as the acquired first probability parameter becomes larger by the probability represented by the first content-specific language model and a value obtained by multiplying a second coefficient becoming larger as the acquired second probability parameter becomes larger by the probability represented by the second content-specific language model becomes, the larger the probability that the specific word appears in the word sequence corresponding to the part corresponding to the target word sequence of the speech becomes.

According to this, it is possible to increase a degree that a probability represented by the first content-specific language model is reflected on the language model, as the probability that the content represented by the target word sequence is the first content becomes larger. In a like manner, it is possible to increase a degree that a probability represented by the second content-specific language model is reflected on the language model, as the probability that the content represented by the target word sequence is the second content becomes larger. As a result, it is possible to recognize a word sequence corresponding to a speech with high accuracy.

In this case, it is preferred that:

the speech recognizing means is configured to generate the inputted word sequence by executing the speech recognition process of recognizing the word sequence corresponding to the inputted speech;

the language model creating means is configured to create the language model based on the inputted word sequence generated by the speech recognizing means; and the speech recognizing means is configured to again execute the speech recognition process of recognizing the word sequence corresponding to the inputted speech, based on the language model created by the speech model creating means.

In this case, it is preferred that the speech recognition device is configured to execute an iterative process of alternately repeating the speech recognition process that the speech recognizing means recognizes the word sequence corresponding to the inputted speech based on the language model created by the language model creating means and the language model creation process that the language model creating means creates the language model based on the word sequence recognized by the speech recognizing means.

As the accuracy of an inputted word sequence (the degree of coincidence with an actual word sequence) becomes higher, it is possible to acquire the first probability parameter and the second probability parameter with higher accuracy. Moreover, as the accuracy of the first probability parameter and the second probability parameter becomes higher, it is possible to create a language model that enables recognition of a word sequence corresponding to a speech with higher accuracy. Therefore, the abovementioned configuration makes it possible to recognize a word sequence corresponding to a speech with still higher accuracy.

In this case, it is preferred that the speech recognition device is configured to execute an iterative process of alternately repeating the speech recognition process that the speech recognizing means recognizes the word sequence corresponding to the inputted speech based on the language model created by the language model creating means and the language model creation process that the language model creating means creates the language model based on the word sequence recognized by the speech recognizing means.

In this case, it is preferred that the finish condition is a condition that a word sequence recognized by the previous speech recognition process coincides with a word sequence recognized by the present speech recognition process.

Further, it is preferred that the finish condition is a condition that a number of times of execution of the speech recognition process is larger than a preset threshold number of times.

Further, a language model creation method as another exemplary embodiment of the present invention, comprising, in a case that a first content-specific language model representing a probability that a specific word appears in a word sequence representing a first content and a second content-specific language model representing a probability that the specific word appears in a word sequence representing a second content are stored in a storing device:

acquiring a first probability parameter representing a probability that a content represented by a target word sequence that is at least part of an inputted word sequence, which is a word sequence included in a speech recognition hypothesis generated by execution of a speech recognition process of recognizing a word sequence corresponding to a speech and is a word sequence having been inputted, is the first content, and a second probability parameter representing a probability that the content represented by the target word sequence is the second content; and creating a language model representing a probability that the specific word appears in a word sequence corresponding to a part corresponding to the target word sequence of the speech, based on the acquired first probability parameter, the acquired second probability parameter, the stored first content-specific language model, and the stored second content-specific language model.

In this case, the language model creation method comprises:

creating the language model that the larger a sum of a value obtained by multiplying a first coefficient becoming larger as the acquired first probability parameter becomes larger by the probability represented by the first content-specific language model and a value obtained by multiplying a second coefficient becoming larger as the acquired second probability parameter becomes larger by the probability represented by the second content-specific language model becomes, the larger the probability that the specific word appears in the word sequence corresponding to the part corresponding to the target word sequence of the speech becomes.

Further, a language model creation computer program as another exemplary embodiment of the present invention is a computer program comprising instructions for causing an information processing device to realize:

a content-specific language model storing processing means configured to cause a storing device to store a first content-specific language model representing a probability that a specific word appears in a word sequence representing a first content, and a second content-specific language model representing a probability that the specific word appears in a word sequence representing a second content; and a language model creating means configured to:

acquire a first probability parameter representing a probability that a content represented by a target word sequence that is at least part of an inputted word sequence, which is a word sequence included in a speech recognition hypothesis generated by execution of a speech recognition process of recognizing a word sequence corresponding to a speech and is a word sequence having been inputted, is the first content, and a second probability parameter representing a probability that the content represented by the target word sequence is the second content; and create a language model representing a probability that the specific word appears in a word sequence corresponding to a part corresponding to the target word sequence of the speech, based on the acquired first probability parameter, the acquired second probability parameter, the stored first content-specific language model, and the stored second content-specific language model.

In this case, it is preferred that the language model creating means is configured to create the language model that the larger a sum of a value obtained by multiplying a first coefficient becoming larger as the acquired first probability parameter becomes larger by the probability represented by the first content-specific language model and a value obtained by multiplying a second coefficient becoming larger as the acquired second probability parameter becomes larger by the probability represented by the second content-specific language model becomes, the larger the probability that the specific word appears in the word sequence corresponding to the part corresponding to the target word sequence of the speech becomes.

An invention of a speech recognition device, a language model creation method or a language model creation program having the aforementioned configuration can achieve the aforementioned object of the present invention because having like actions as the language model creation device described above.

Although the present invention has been described above with reference to the respective exemplary embodiments, the present invention is not limited to the aforementioned exemplary embodiments. The configuration and details of the present invention can be altered in a various manners that can be understood by those skilled in the art within the scope of the present invention.

As a modified example of the abovementioned exemplary embodiments, any combination of the aforementioned exemplary embodiments and modified examples may be adopted.

Further, a program is stored in a storing device in the abovementioned exemplary embodiments, but may be stored in a recording medium that can be read by a CPU. For example, the recording medium is a portable medium such as a flexible disk, an optical disk, a magneto-optical disk, and a semiconductor memory.

The present invention is based upon and claims the benefit of priority from Japanese patent application No. 2008-304564, filed on Nov. 28, 2008, the disclosure of which is incorporated herein in its entirety by reference.

The present invention can be applied to a speech recognition device that executes a speech recognition process of recognizing a word sequence represented by a speech from the speech.

The invention claimed is:

1. A language model creation device comprising:
a language model creating unit configured to execute a language model creation process of:
acquiring a first content-specific language model which represents an appearance probability that a specific word appears in a first content, the first content comprising a first word sequence, a second content-specific language model which represents an appearance probability that the specific word appears in a second content, the second content comprising a second word sequence, a first probability parameter representing a probability that a content represented by a target word sequence is the first content, and a second probability parameter representing a probability that the content represented by the target word sequence is the second content, the target word sequence being at least a part of a speech recognition hypothesis generated in a speech recognition process; and
creating a language model based on the first probability parameter, the second probability parameter, the first content-specific language model and the second content-specific language model, the created language model representing a combined appearance probability which is a probability that the specific word appears within at least a portion of the target word sequence.

2. The language model creation device according to claim 1, wherein:
the language model creating unit is configured to create the language model such that the combined appearance probability increases as a sum of (i) a product of a first coefficient and the probability represented by the first content-specific language model, and (ii) a product of a second coefficient and the probability represented by the second content-specific language model, becomes larger, wherein the first coefficient increases in value as the first probability parameter becomes larger, and the second coefficient increases in value as the second probability parameter becomes larger.

3. The language model creation device according to claim 1, wherein:
the language model creating unit is configured to execute the language model creation process on each of a plurality of target word sequences obtained by dividing the speech recognition hypothesis on a border of words.

4. The language model creation device according to claim 1, wherein:
the language model creating unit is configured to execute the language model creation process on each of a plurality of target word sequences obtained by dividing the speech recognition hypothesis at a position different from a border of words.

5. The language model creation device according to claim 3, wherein:
the language model creating unit is configured to, in a case that both the first probability parameter and the second probability parameter are smaller than a preset lower limit threshold, set a value of the first probability parameter and a value of the second probability parameter equal to each other.

6. The language model creation device according to claim 3, wherein:
the language model creating unit is configured to, in a case that the first probability parameter, acquired with respect to a certain target word sequence of the plurality of target word sequences, is larger than a preset upper limit threshold, increase the first probability parameter, acquired with respect to an adjacent target word sequence which is adjacent to the certain target word sequence.

7. The language model creation device according to claim 1, wherein:
the language model creating unit is configured to acquire the first probability parameter and the second probability parameter, based on a theory of conditional random fields.

8. The language model creation device according to claim 1, wherein:
the language model creating unit is configured to acquire the first probability parameter and the second probability parameter, based on at least one of word attribute information and speech recognition process information, the word attribute information representing an attribute of a word of the target word sequence, the speech recognition process information being acquired when the speech recognition process is executed.

9. The language model creation device according to claim 8, wherein:
the word attribute information includes at least one of information representing a word surface, information representing pronunciation, and information representing a part of speech.

10. The language model creation device according to claim 8, wherein:
the speech recognition process information includes at least one of information representing recognition reliability, information representing a length of duration, and information representing presence/absence of a preceding silence, the recognition reliability being reliability of a recognition result of the speech recognition process, the length of duration being a time period during which one sound continues.

11. The language model creation device according to claim 1, wherein:
the language model creating unit is configured to acquire, based on at least one of information representing a position where the target word sequence is in the speech recognition hypothesis, the first probability parameter and the second probability parameter, information representing that the speech recognition hypothesis includes a plurality of same words, information representing a contents' connective state in the speech recognition hypothesis, and information representing, in a case that there are a plurality of speech recognition hypotheses, a relation between the speech recognition hypotheses.

12. A speech recognition device, comprising:
a language model creating unit configured to execute a language model creation process of:
acquiring a first content-specific language model which represents an appearance probability that a specific word appears in a first content, the first content comprising a first word sequence, a second content-specific language model which represents an appearance probability that the specific word appears in a second content, the second content comprising a second word sequence, a first probability parameter representing a probability that a content represented by a target word sequence is the first content, and a second probability parameter representing a probability that the content represented by the target word sequence is the second content, the target word sequence being at least a part of a speech recognition hypothesis generated in a speech recognition process; and
creating a language model based on the first probability parameter, the second probability parameter, the first content-specific language model and the second content-specific language model, the created language model representing a combined appearance probability which is a probability that the specific word appears within at least a portion of the target word sequence; and
a speech recognizing unit configured to execute a speech recognition process of recognizing a word sequence corresponding to an inputted speech, based on the language model created by the language model creating unit.

13. The speech recognition device according to claim 12, wherein:
the language model creating unit is configured to create the language model such that the combined appearance probability increases as a sum of (i) a product of a first coefficient and the probability represented by the first content-specific language model, and (ii) a product of a second coefficient and the probability represented by the second content-specific language model, becomes larger,
wherein the first coefficient increases in value as the first probability parameter becomes larger, and the second coefficient increases in value as the second probability parameter becomes larger.

14. The speech recognition device according to claim 12, wherein:
the speech recognizing unit is configured to execute the speech recognition process and thereby generate the speech recognition hypothesis;

the language model creating unit is configured to create the language model, based on the speech recognition hypothesis generated by the speech recognizing unit; and the speech recognizing unit is configured to again execute the speech recognition process, based on the language model created by the speech model creating unit.

15. The speech recognition device according to claim 12, configured to execute an iterative process of alternately and repeatedly executing the speech recognition process and the language model creation process, the speech recognition process being executed, based on each language model created by the language model creating unit, by the speech recognizing unit, the language model creation process being executed, based on each word sequence recognized by the speech recognizing unit, by the language model creating unit.

16. The speech recognition device according to claim 15, configured to finish the iterative process in a case that a predetermined termination condition is satisfied.

17. The speech recognition device according to claim 16, wherein:
the termination condition is a condition that a word sequence recognized in a previous recognition process coincides with a word sequence recognized in a most recent speech recognition process.

18. The speech recognition device according to claim 16, wherein:
the termination condition is a condition that a number of times of execution of the speech recognition process is larger than a preset threshold number of times.

19. A language model creation method executed by at least one processor, comprising:
acquiring a first content-specific language model which represents an appearance probability that a specific word appears in a first content, the first content comprising a first word sequence, a second content-specific language model which represents an appearance probability that the specific word appears in a second content, the second content comprising a second word sequence, a first probability parameter representing a probability that a content represented by a target word sequence is the first content, and a second probability parameter representing a probability that the content represented by the target word sequence is the second content, the target word sequence being at least a part of a speech recognition hypothesis generated in a speech recognition process; and creating, by the at least one processor, a language model based on the first probability parameter, the second probability parameter, the first content-specific language model and the second content-specific language model, the created language model representing a combined appearance probability which is a probability that the specific word appears within at least a portion of the target word sequence.

20. The language model creation method according to claim 19, comprising:
creating the language model such that the combined appearance probability increases as a sum of (i) a product of a first coefficient and the probability represented by the first content-specific language model, and (ii) a product of a second coefficient and the probability represented by the second content-specific language model, becomes larger, wherein the first coefficient increases in value as the first probability parameter becomes larger, the second coefficient increases in value as the second probability parameter becomes larger.

21. A non-transitory computer-readable medium storing a language model creation program comprising instructions for causing an information processing device to realize:
a language model creating unit configured to execute a language model creation process of:
acquiring a first content-specific language model which represents an appearance probability that a specific word appears in a first content, the first content comprising a first word sequence, a second content-specific language model which represents an appearance probability that the specific word appears in a second content, the second content comprising a second word sequence, a first probability parameter representing a probability that a content represented by a target word sequence is the first content, and a second probability parameter representing a probability that the content represented by the target word sequence is the second content, the target word sequence being at least a part of a speech recognition hypothesis generated in a speech recognition process; and creating a language model based on the first probability parameter, the second probability parameter, the first content-specific language model and the second content-specific language model, the created language model representing a combined appearance probability which is a probability that the specific word appears within at least a portion of the target word sequence.

22. The non-transitory computer-readable medium storing the language model creation program according to claim 21, wherein:
the language model creating unit is configured to create the language model such that the combined appearance probability increases as a sum of (i) a product of a first coefficient and the probability represented by the first content-specific language model, and (ii) a product of a second coefficient and the probability represented by the second content-specific language model, becomes larger, wherein the first coefficient increases in value as the first probability parameter becomes larger, the second coefficient increases in value as the second probability parameter becomes larger.

* * * * *